United States Patent [19]
DeCaussin

[11] 3,872,743
[45] Mar. 25, 1975

[54] REMOVABLE ATTACHMENT FOR AUTOMATING MILLING MACHINES

[75] Inventor: David Edward DeCaussin, Van Nuys, Calif.

[73] Assignee: Fadal Engineering Company, Inc., North Hollywood, Calif.

[22] Filed: Jan. 14, 1974

[21] Appl. No.: 433,394

Related U.S. Application Data

[62] Division of Ser. No. 329,111, Feb. 2, 1973.

[52] U.S. Cl................ 74/817, 74/128, 74/822
[51] Int. Cl............................................ B23b 29/32
[58] Field of Search ............ 74/813, 816, 817, 819, 74/822, 128, 141.5

[56] References Cited
UNITED STATES PATENTS

| | | | |
|---|---|---|---|
| 2,915,921 | 12/1959 | Scholin et al. | 74/817 X |
| 3,580,111 | 5/1971 | Tyrner | 74/817 |
| 3,633,442 | 1/1972 | Stoen | 74/822 |
| 3,745,856 | 7/1973 | Aaron et al. | 74/819 |

Primary Examiner—Samuel Scott
Assistant Examiner—F. D. Shoemaker
Attorney, Agent, or Firm—Singer & Singer

[57] ABSTRACT

A portable bracket assembly capable of being attached to the spindle carriage of a milling machine. A self-contained indexing table and indexing means is located on the assembly together with a transfer arm having three degrees of freedom and articulated fingers for selecting a tool holder from the indexing table and inserting the selected tool holder into the spindle of the milling machine when operated in a first direction and reversing the sequence when operated in the opposite direction. The assembly attachment allows a numerical controlled milling machine to perform sequential operations on a work piece that requires the use of a plurality of different individual tools.

4 Claims, 16 Drawing Figures

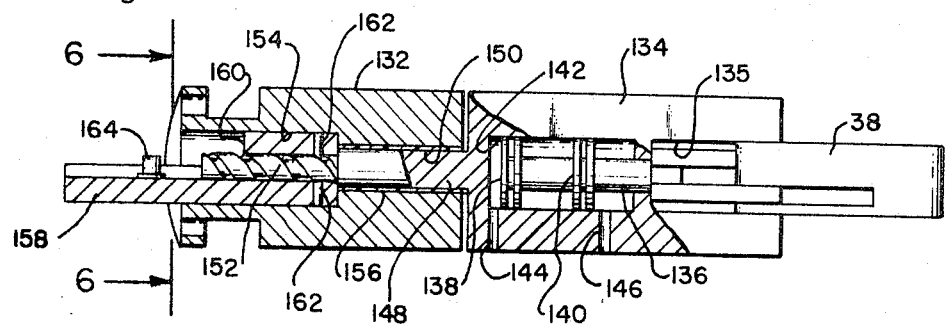
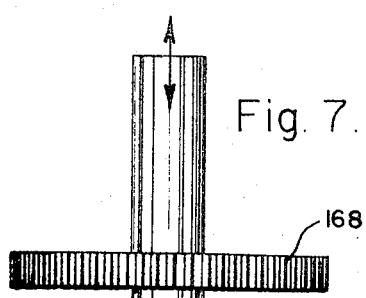
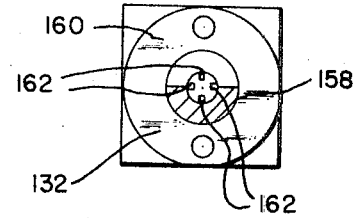
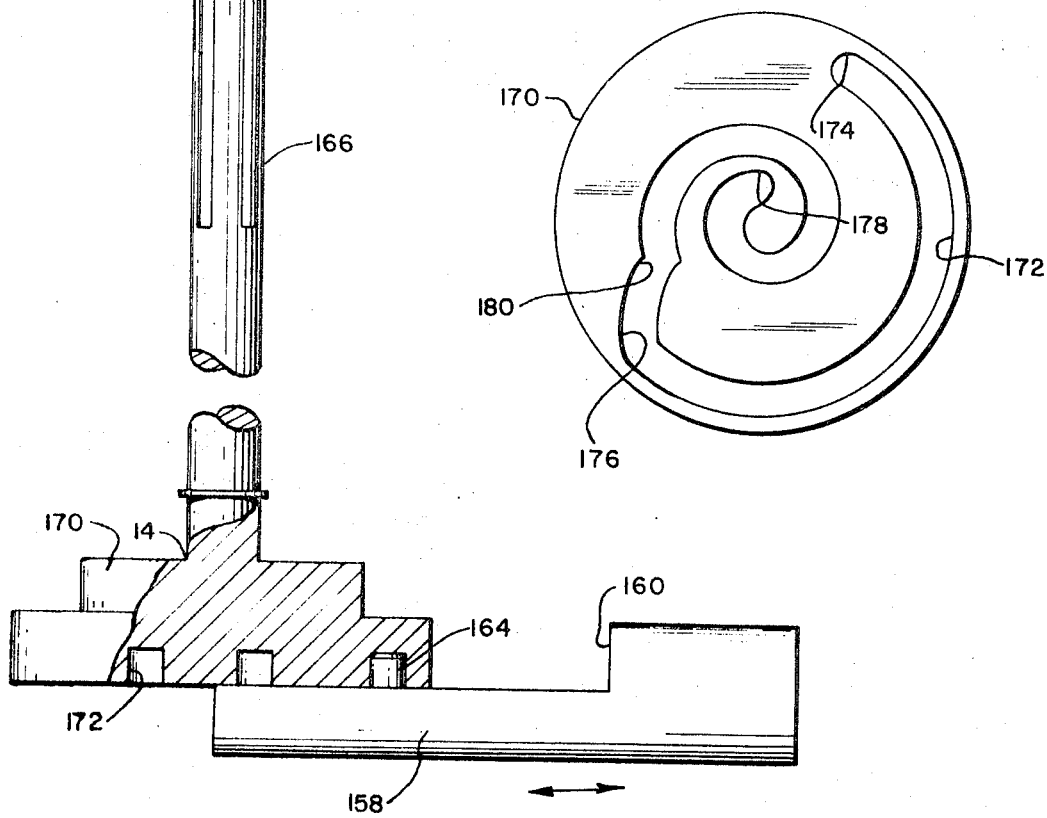

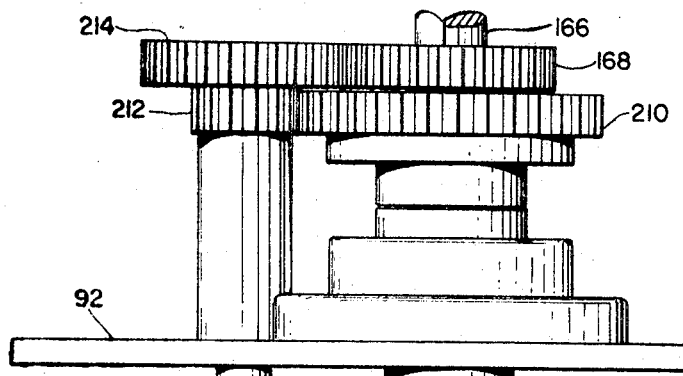
Fig. 9.
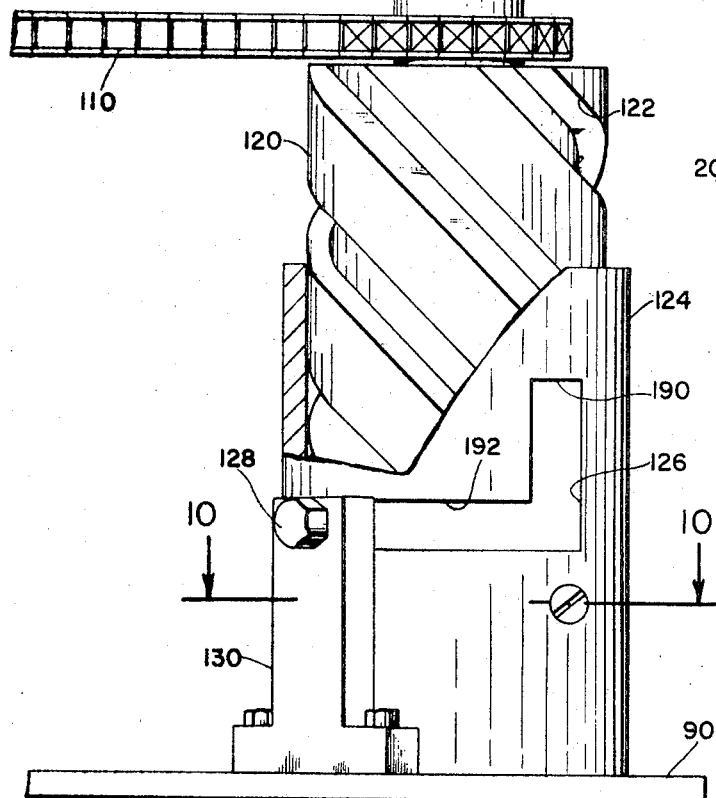
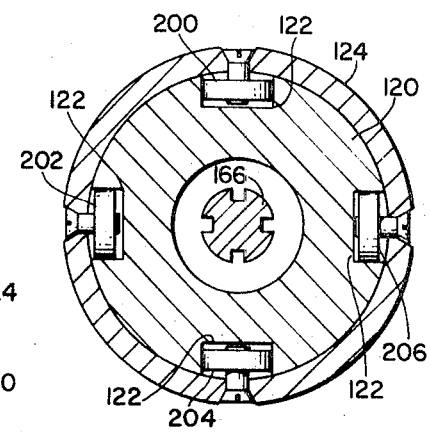
Fig. 10.
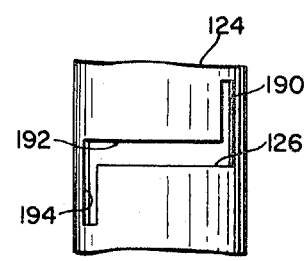
Fig. 11.
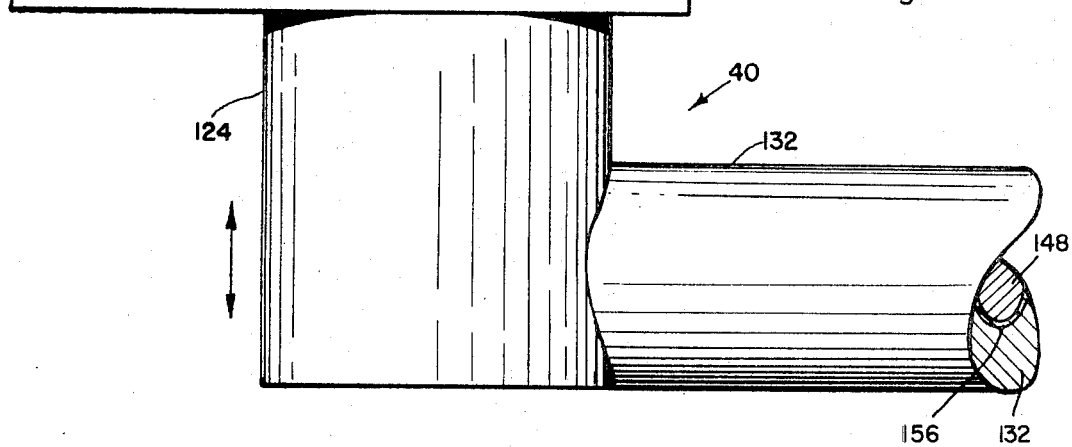

REMOVABLE ATTACHMENT FOR AUTOMATING MILLING MACHINES

This invention is a division of parent case, Ser. No. 329,111, filed Feb. 2, 1972.

This invention relates to a portable attachment for use with a conventional milling machine and, more specifically, to an attachment assembly having the capability of allowing a conventional milling machine to sequentially select a plurality of tool holders to perform a complete machining operation on a work piece without intervention from a human operator.

In the art of numerically controlled machine tools, it is well known to use a numerical control tape driven device in combination with a milling machine to perform repetitive production machining operations. The principle of the numerical control requires the programming of a tape and establishing of a home position on the work table holding the work piece. The first cutting operation is programmed to start from the home position and to then follow a tortuous path during the cutting operation dictated by the shape of the piece and the desired outcome. The first cut is programmed to end at the home position at which time the tape is programmed to stop the machine and allow the operator to remove the first cutting tool and insert the next cutting tool.

Depending on the complexity of the work piece which, for example, may be a cam requiring possibly thirty different tools to complete the finished operation, the tape is programmed for each of the sequential thirty different operations. Each program is complete for a given tool as to rate of cut, depth of cut, and path being traversed.

There are available in the field today a wide variety of numerical controlled programmers for use with different machine tools. Most of the larger machine tool manufacturers also sell complete packages which include the machine tool and the numeric control means, which thereby allows the buyer a wide selection of machine tools and numerical control devices.

A most significant advance in the field of automatic machine tool operations occurred when the major machine tool manufacturers perfected and made available to the industry a complete numerically controlled machining center. The machine center provides in one master installation a milling machine having the capability of holding a plurality of tool holders and means for automatically and sequentially selecting the individual tool holder in accordance with the work requirements of the individual work piece. The machine center is under the control of a numerical controller which provides the user with the capability of manufacturing a complex work piece by one machine from start to finish and all under the control of a single numerical controller.

Machine centers of the type just described are presently available from the Kearney and Trecker Corporation of Milwaukee, Wisconsin, and the Gorton Machine Corporation of Racine, Wisconsin.

These machining centers are undoubtedly extremely powerful and useful machines for manufacturing high production repetitive items; however, the cost of such machines is in the hundreds of thousands of dollars and, hence, not available to the small machine operator.

This invention is concerned with a portable attachment capable of being moved from machine to machine and attached to a conventional milling machine having the capability of being controlled by a numerical controller. The attachment works in conjunction with the milling machine and the numerical controller and provides the basis for individually selecting up to 30 different tool holders which can be individually and sequentially programmed to be inserted into the spindle of the cutting machine and automatically removed when the cutting operation for that cutting tool is finished as determined by the numerical controller. The complete operation is automatic and sequential and does not require intervention of the operator other than to start the machine when the first work piece is inserted and then stop the machine and remove the work piece when all the operations are completed.

In other words, this invention allows a conventional milling machine of the type that costs approximately 20,000.00 dollars to now have the capability, with the disclosed portable attachment, of performing sequential operations presently available only with machines costing almost ten times that figure. In addition, the attachment is a true separate attachment and does not become part of the machine but may be removed and placed on different machines as the needs of the business dictate. It then becomes obvious that cost savings to the small machine shop operator are enormous since he only has to invest in the basic milling machines and those adaptors as required by the needs of his business.

In the conventional milling machine of the type manufactured by the Bridgeport Company, the tool holder is held in the spindle by a rod extending through the spindle to the top of the drive mechanism where it is terminated by a locking nut. In the normal operation of changing tool holders, the operator must first stop the spindle then loosen the locking nut which allows the tool holder to be removed. A new tool holder is then inserted and the lock nut tightened to maintain the tool holder within the spindle for the next operation.

In order to practice the present invention it is desirous to automate the insertion and removal of the tool holder into the spindle. In one embodiment an impact wrench operated either by an electrical motor or an air motor is connected to the top of the machine over the locking nut which either tightens or loosens the spindle depending on the direction of rotation of the impact motor. In the preferred embodiment a conventional impact tool motor operated by air is connected to the locking nut with two separate air lines controlled by a valve which allows the operator to energize the motor in one direction to tighten or, in the alternative, to energize the motor in the opposite direction to loosen the spindle. The impact tool motor is preferably permanently connected to each of the individual milling machines for use by the operator when individually changing tool holders.

One embodiment of the portable tool changing adaptor has been built and constructed using air as the source of power for moving the indexing table and the transfer arms. It will be apparent to those skilled in the art that the invention may be practiced by using other sources of power such as hydraulic or electrical power may be used to drive the indexing table, the transfer arm or the impact tool motor.

The portable adaptor is constructed in the form of an L shape in which the vertical portion of the L is connected to the spindle and drive motor carriage which is movably attached to the base of the milling machine.

In order not to interfere with the movement of the carriage and, hence, the spindle during normal milling operations, the portable attachment is connected at opposite extremeties of the spindle carriage. The maximum fore and aft movement of the spindle carriage is reduced by the thickness of the attaching members holding the portable attachment. In the preferred embodiment the mounting bracket arms are each one inch thick, thereby restricting total movement of the carriage by two inches.

The portable attachment holds the indexing table control and the indexing table which supports a plurality of tool holders in an ordered relationship. Located on the portable attachment is the transfer arm and control which controls the function of the transfer arm and jaws for selecting the individual tool holders from the indexing table to the spindle of the milling machine. The master control and moving parts for operating the transfer arm are all located on the portable attachment, thereby requiring a minimum of inter-connections between the milling machine and the attachment to move the portable attachment from machine to machine.

The space between the tool holder in the selected position on the indexing table and the spindle on the milling machine is determined by the length of the transfer arm. By attaching the portable attachment to the spindle carriage, movement of the carriage for any reason does not upset the given relationship between the indexing table and the spindle since both are attached to the same carriage and move together. In other words, once the portable attachment is aligned on the spindle carriage for any given machine, the operator need not be concerned with performing milling operations on different work pieces having a different home position.

In practicing the invention, the portable attachment is initially set up on the spindle carriage and locked in place. The work piece is located on the movable bed of the machine in a conventional manner and the necessary tool holders, each having the proper tool, are inserted sequentially in the holes located on the indexing table. Separate lines for controlling the impact tool motor are connected to the master control located on the portable attachment. In addition, lines for starting and stopping the spindle of the milling machine are also connected to the master control. A home limit switch is attached to the movable bed and adapted to contact a fixed support arm when the movable bed is located in the home position. A line from the limit switch is connected to the master control and will generate a signal when the movable bed has returned to the home position as an indication that the sequence of operations for any given tool has been completed. A conventional numerical control is connected to the milling machine.

Pressing the start button starts the spindle on the milling machine and the numerical controller which moves the work piece in relationship to the tool through a tortuous path starting from the home position and back to the home position. Returning the movable bed to the home position energizes the limit switch located on the carriage which signals the master controller that the first sequence of operations for the first tool is over. The normal or home position for the transfer arm is in close proximity to the tool holder on the spindle and with the jaws opened so as not to interfere with the movement of the milling machine. Energizing the master controller results in the following programmed sequential steps of stopping the spindle, closing the jaws, energizing the impact tool motor to unlock the tool holder and energizing the transfer arm control.

The transfer arm control performs a complex mechanical movement which lowers the transfer arm with the tool holder and translates the tool holder to the indexing table while at the same time the jaws holding the tool holder are rotated 180° to enable the tool holder to fit into the hole located in the indexing table in a conventional gravity held position. With the tool holder position in the indexing table, the master controller opens the jaws and then energizes the indexing table control to move the indexing table to the next tool holder position. With the indexing table locked in position the master controller closes the jaws about the tool holder and again energizes the transfer arm control to reverse the process which includes lifting the tool holder from the index table and translating the tool holder to the spindle, while at the same time rotating the transfer arm 180° to allow the tool holder to be inserted into the spindle. The master controller then energizes the impact tool motor to lock the tool holder in the spindle after which the jaws are opened, the spindle is started and the numerical controller energized to control the movement of the movable bed for tool number two. Completion of the sequence for tool number two will be detected by the movable bed being returned to the home position which is detected by the energizing of the limit switch which controls the master controller.

The sequence will then complete itself for the full number of individual tool holders located on the indexing table until the last tool holder has been inserted in the milling machine and the last cut made as programmed by the numerical controller.

Upon completion of the last cut, the master controller will continue to cycle the index table back to the first tool holder position which will be selected and inserted into the spindle. The master controller will start the spindle and upon the completion of the last of the programmed operations, the numerical controller will automatically rewind the tape and provide no instructions to the milling machine. The operator presses the stop button to stop the spindle from rotating and the finished work piece is removed and a new work piece inserted on the movable bed. The rewound tape is reinserted into the numerical controller and the manual start button pressed to again start the cycle for producing another completed work piece.

Further objects and advantages of the present invention will be made more apparent by referring now to the accompanying drawings wherein:

FIG. 5 is a cross-section of the horizontal portion of the arm illustrating how the rotatable jaws holding the tool holder are rotated 180°;

FIG. 6 is a section 6—6 on FIG. 5;

FIG. 7 illustrates the power drive which independently drives a straight fluted shaft and cam assembly for rotating the jaws illustrated in FIG. 5;

FIG. 8 is an end view of the cam illustrated in FIG. 7 forming part of the cam assembly for rotating the jaws;

FIG. 9 illustrates the main drive cam for translating the arm assembly from the indexing table to the spindle and back from the spindle to the indexing table;

FIG. 10 is a section taken along lines 10—10 of FIG. 9;

FIG. 11 illustrates details of the cam surface on the arm assembly; and

Figure 1:
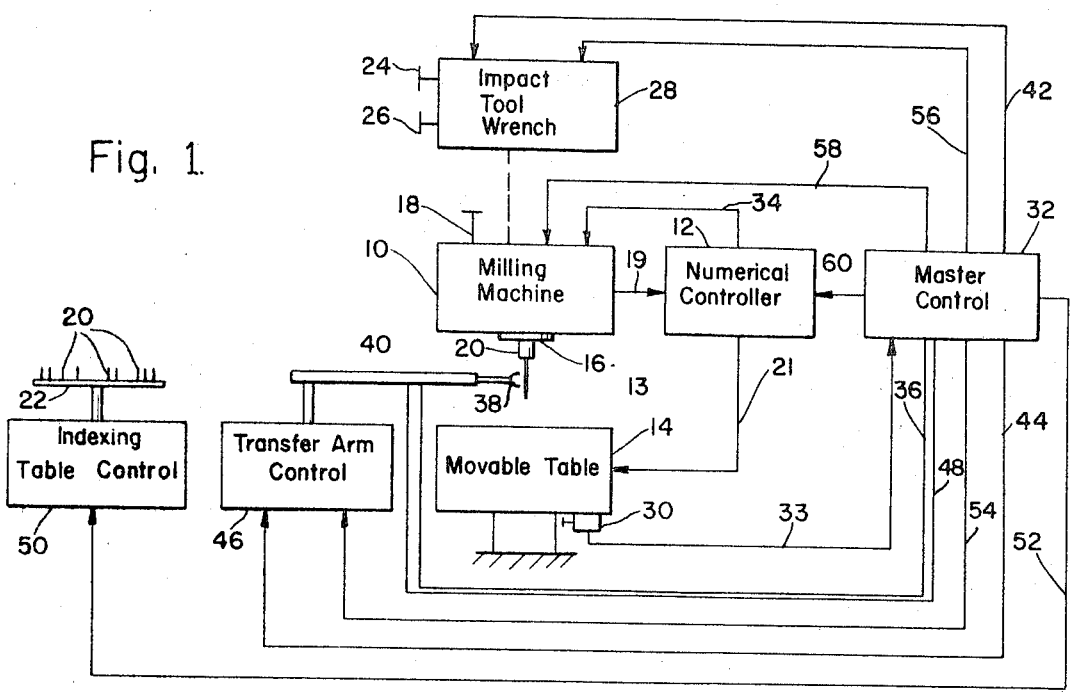
FIG. 1 is a block diagram illustrating the interactions between the portable attachment and the milling machine.

Referring now to FIG. 1 there is shown a block diagram illustrating the functions performed by the portable attachment in moving tool holders from an indexing table to the spindle of a milling machine and return.

The foregoing description is made in connection with a pneumatic control system as the primary control power and in conjunction with a numerical controller and a milling machine. It will be appreciated by those skilled in the art that the portable attachment may be used in connection with any kind of cutting machine and is not necessarily limited to a milling machine. The embodiment built and tested used pneumatic power; however, it will be appreciated that any source of power such as electrical power or hydraulic power may be used to perform the functions to be described.

The individual tools associated with a milling machine are individually held in a tool holder which generally has a tapered shank that fits into a spindle located on the milling machine. A draw bar locks the tool holder into the spindle. The cutting tool projects down into the work piece from the tool holder. The problem confronting the art today is to hold a plurality of tool holders on a suitable indexing table and then sequentially transfer a tool holder from the indexing table to the spindle and return the tool holder to the indexing table at the conclusion of the cutting operation for that tool. The operation must then be repeated sequentially for all the tool holders located on the indexing table.

Holding the individual tool holders on a horizontal indexing table by gravity requires that each tool holder be individually rotated 180° before being inserted into the spindle of the milling machine. Conversely, each tool holder must be rotated 180° when being removed from the spindle to the indexing table.

The prior art has solved the problem by creating special purpose milling machine centers in which the plurality of tool holders are located in various positions above the spindle or are mounted on a vertical carousal. In this manner the individual tool holder need not be rotated 180° for insertion into the spindle; however, in view of the special location required, it was necessary to build special purpose machines.

In the so-called machine centers of the type manufactured by Milwaukee, the individual tool holders are located on an indexing table that is either mounted vertically or at a 45° angle to hold the tool holders. Because of the problem of holding the tool holders in place on the indexing table, the prior art has disclosed many special-purpose tool holders that can only be used on a special machine with a special indexing head. The special-purpose tool holders unfortunately further increase the cost of the machine and limit the use of the tool holder.

Since the machine center is a complete single unit machine incorporating the indexing table and the milling machine, they are, of course, unique and capable but also very expensive.

In the present invention the uniqueness which allows complete portability and compatibility with different cutting machines is the fact that the individual tool holders are mounted on a horizontal indexing table with the tapered shank of the tool holder inserted in selected holes located on the periphery of the indexing table. In this manner conventional tool holders may be used and the individual tool holders remain located in the indexing table by the force of gravity alone.

The problem of transferring the individual tool holder from the normal position as located in the indexing table to the reverse position as required by the milling machine has been solved by a unique transfer arm having articulated jaws that not only selects and translates the individual tool holder but also rotates the jaws holding the tool holder 180° during the translation so as to insert the tool holder within the spindle of the milling machine and within a space that is less than the length of the tool holder and tool itself.

Referring now to FIG. 1 there is shown a functional layout of the operating characteristics of the portable attachment and the inter-connections between a conventional milling machine and a numerical controller. For example, a milling machine 10 is connected with a numerical controller 12 of the type that is tape controlled for moving a movable table 14 from a home position through a tortuous path and returned to the home position.

In the normal operation the operator loads the numerical controller 12 with a tape for performing a specific series of operations on a work piece 13 such as a cam located on the work table 14. The operator starts the spindle 16 by depressing the spindle start switch 18 associated with the milling machine 10. Depressing switch 18 also starts the numerical controller 12 through line 19. With a given tool holder 20 located in the spindle 16 of the milling machine 10 the numerical controller 12 through line 21 controls the movable table 14 which starts at a fixed home position and moves the movable bed 14 from the home position through a pre-determined path and back to the home position at which time the spindle is stopped.

In the absence of the present invention the operator would then remove the first tool holder 20 and insert a second tool holder in the spindle 16 and again press the switch 18 to start the spindle and the numerical controller 12. The tape in the numerical controller 12 again automatically programs the movable table 14 from the home position through the tortuous path back to the home position at which time the spindle stops and the process is repeated again for the total number of tools needed to complete the cam work piece 13.

The present invention provides an indexing table 22 having a plurality of openings on the periphery for accepting a plurality of tool holders 20 located in an ordered relationship. The operator loads the program tape within the numerical controller 12 and inserts the very first tool holder 20 in the spindle 16 of the milling machine 10. The tool holder is either locked or unlocked by using either manual switch 24 or 26 associated with an impact tool wrench 28.

Switch 24 and 26 actually control the direction of rotation of the impact tool wrench 28. In the preferred embodiment a pneumatic impact wrench was used and the switches 24 and 26 control the application of the pneumatics to the wrench to thereby control the direction of rotation of the impact tool motor. The direction of rotation determines whether the tool holder is being tightened or loosened.

Pressing the manual spindle start push button 18 starts the rotation of spindle 16 and the numerical controller 12 through line 19. The first cut on the cam work piece is performed under the guidance of the numerical control tape associated with the numerical controller 12 which eventually moves the movable table 14 from the home position and back to the home position at which time a limit switch 30 attached to the movable table 14 is actuated. The numerical controller 12 will program the work piece through the complete cycle for a given tool and after returning the work piece to the home position will then signal the milling machine through line 34 to stop the spindle 16. With the movable table 14 returned to the home position limit switch 30 is closed which energizes a master control 32 through a line 33. Master control 32 controls the sequence of removing the tool holder 20 from the spindle 16 back to the indexing table 22 and selecting a new tool holder for insertion into the spindle. With the master controller 32 energized the following sequential acts are performed.

The master controller 32 energizes line 36 to close the open jaws 38 located on the transfer arm 40 since the normal position of the transfer arm is with the jaws 38 open and located in a position close to the spindle 16.

Line 42 is energized to control the impact tool wrench 28 to unlock the tool holder 20 from the spindle 16 which is now held by the jaws 38. Line 44 connected to the transfer arm control 46 is energized to move the transfer arm 40 from the spindle 16 to the index table 22. This movement requires a complex movement in three planes in order to clear the tool holder 20 from the spindle 16, rotate the jaws 38 holding the tool 180 degrees and at the same time translate the tool holder from the spindle to the indexing table 22 and place the tool holder into the opening provided in the indexing table.

With the movement completed and the tool holder 20 located in the hole in the indexing table 22 the master controller 32 then energizes line 48 which opens the jaws 38. The indexing table control 50 is energized through line 52 which indexes the indexing table 22 to the next tool holder 20 at which time the indexing table is automatically locked and held in position. Line 36 is energized to close the jaws 38 about the next tool holder. The transfer arm control 46 is energized by line 54 from the master control 32 to reverse the function of the transfer arm 40 which is to remove the tool holder 20 from the indexing table 22 to the spindle 16 while at the same time rotating the jaws 38 with the tool holder 180°. The tool holder is continuously and in the same motion inserted into the spindle 16 of the milling machine 10.

Line 56 connecting the impact wrench 28 with the master control 32 is energized for closing the wrench 22 to thereby lock the tool holder 20 in place in the spindle 16. Line 48 which controls the opening of the jaws 38 is energized to release the tool holder 20.

The master controller 32 energizes line 58 which is connected to the milling machine 10 for starting the spindle 16. The last step in the sequence is the energizing of line 60 which causes the numerical controller 12 to operate.

The numerical controller 12 moves the work piece 13 from the home position through the tortuous path as defined by the tape program for the next tool in the tool holder 20. The complete sequence will again repeat itself with the numerical controller 12 placing the movable table 14 in the home position and the closing of the spindle 16. Switch 24 will again energize the master controller 32 to begin the sequence of operation which begins with the energizing of line 36 to close the jaws 38 about the tool holder 20. The complete sequence of operation then repeats itself until all of the tool holders located on the indexing table 22 have been used and returned.

The numerical controller 12 will continue to operate the milling machine as determined by the tape being used. At the conclusion of the last sequence of operations on the tape the numerical controller will stop the spindle on the milling machine and rewind the tape in preparation for the next sequence of operations. At the conclusion of the last operation the numerical controller 12 has replaced the movable table 14 back to the home position, at which time limit switch 30 has energized the master controller 32. Energizing the master controller 32 begins the sequence of operation of unlocking the impact tool wrench 28 and causing the transfer arm 40 to replace the last tool holder 20 back onto the indexing table 22. The master controller 32 will continue the sequence of operation which includes removing the first tool holder from the indexing table 22 into the spindle 16 at which time the impact tool wrench 28 locks the tool holder in place and the jaws 38 are opened to allow normal operation of the milling machine. The master controller 32 energizes line 58 to start the spindle 16 in preparation for the next operation. However, energizing of line 60 to control the numerical controller 12 will have no effect since the tape has already finished its last operation and has been rewound. The operator then simply stops the spindle of the milling machine 10 and removes the finished work piece 13 from the movable table 14.

The portable attachment comprising the present invention consists of the master controller 32, the transfer arm control 46 together with the transfer arm 40 and jaws 38 and the indexing table control 50 together with the indexing table 22. The complete portable attachment is located within a movable dust cover and is adapted to be moved and attached to individual milling machines.

Figure 2:
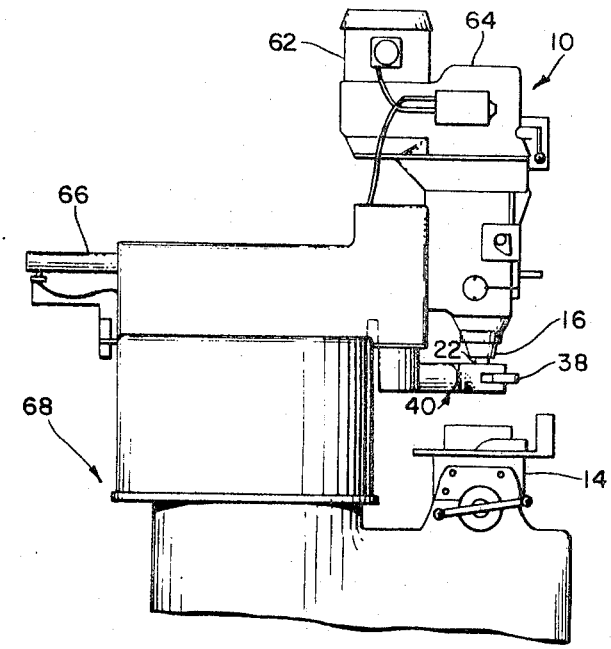
FIG. 2 is a side view of a milling machine with the portable attachment located in place on the spindle carriage.

Referring now to FIG. 2, there is shown a conventional milling machine 10 having a spindle drive motor 62, gear housing 64 and spindle 16 located on a spindle carriage 66 adapted to move in a fore and aft direction on suitable guides not illustrated. The portable attachment 68 is located on one side of the milling machine 10 and is attached to the front overhang and the rear overhang of the spindle carriage 66 as is more fully illustrated in connection with FIG. 3. The portable attachment 68 therefore moves in a fore and aft direction as the spindle carriage 66 moves and, hence, once the initial connection and attachment is made there is no further adjustment or movement necessary.

The transfer arm 40 is illustrated in the normal position with the jaws 38 in the open position near the tool holder 20. The initial positioning of the portable attachment 68 on the carriage 66 is determined primarily by the positioning of the jaws 38 on the transfer arm 40 since the jaws must be in the position when energized to grasp the tool holder 20 when located within the spindle 16.

Figure 3:
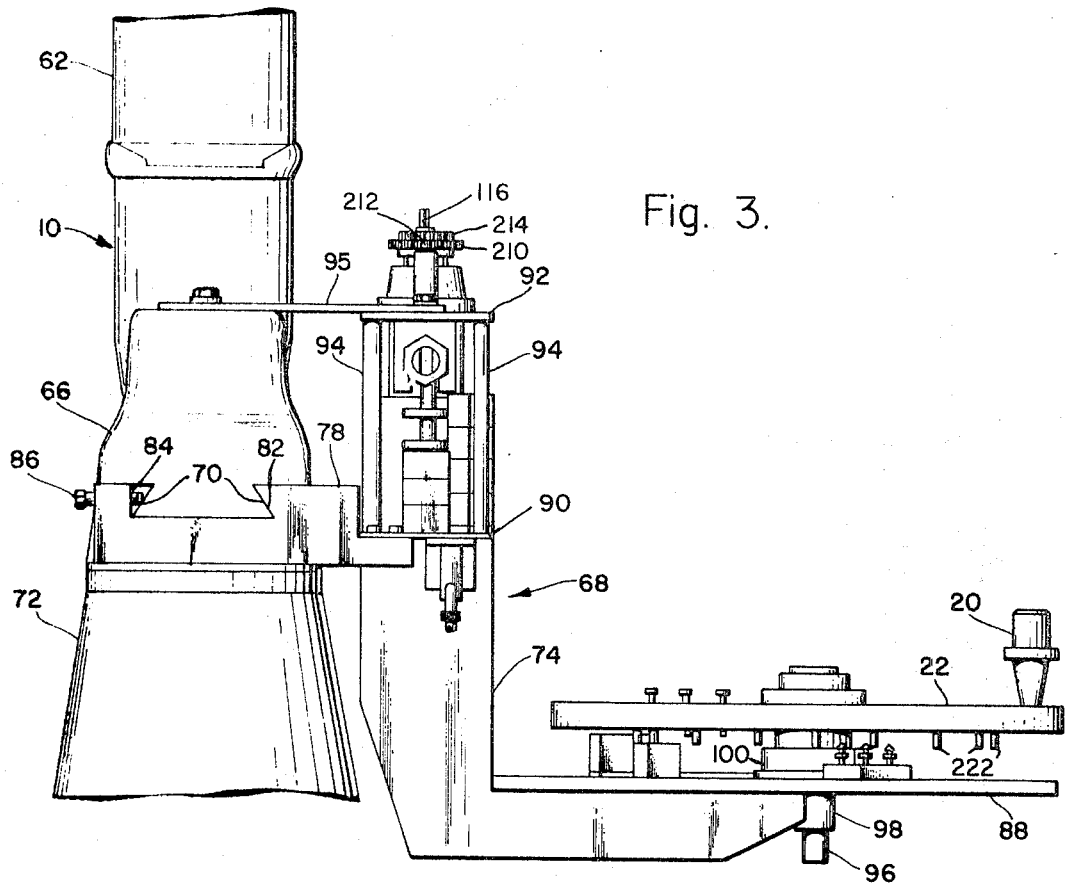
FIG. 3 is a back view illustrating the details of hanging the portable attachment on the spindle carriage.
Figure 4:
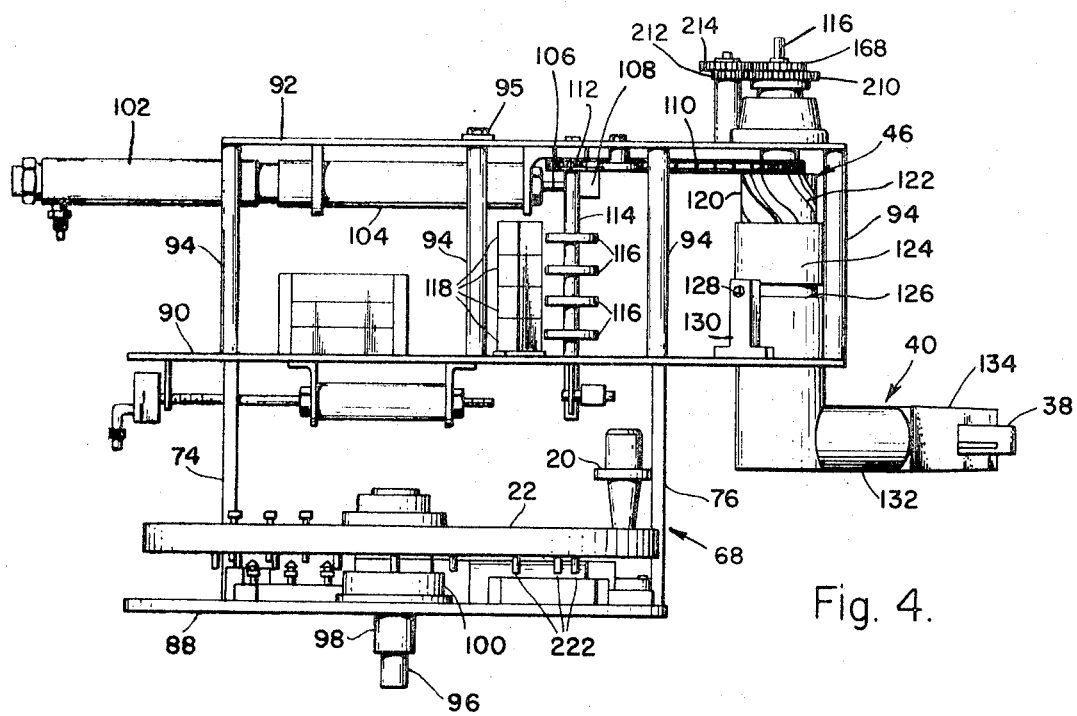
FIG. 4 is a front view of the portable attachment showing the physical relationship between the control arm and the indexing table.

Referring now to FIGS. 3 and 4, there is shown a back view and front view, respectively, of the milling machine 10 and the portable attachment 68. The spindle carriage 66 moves in the fore and aft direction on the dovetail track 70 which is the conventional means for having the base 72 of the milling machine support the heavy weight of the spindle carriage and also provide the rigidity and proper alignment during the movement of the carriage. The portable attachment 68 is actually constructed in the form of an L as defined by two L-shaped brackets 74 and 76. A pair of support arms 78 and 80 (not illustrated) each having a dovetail cutout 82 similar to the dovetail 70 located on the spindle carriage 66 are attached to the spindle carriage at the extreme ends so as not to interfere with the movement of the carriage during normal operations. The rear most arm 78 is more fully illustrated in FIG. 3 and shows how the arm is movably attached to the spindle carriage 66 by means of the dovetail 82 on one side of the arm and the straight edge 84 on the other arm. The locking screw 86 in each arm 78 and 80 bears against the outside surface of dovetail 70 located on the spindle carriage 66. Support arm 80 is similar to support arm 78 and locks to the spindle carriage 66 in the same fashion.

The frame of the portable attachment consists of L-shaped brackets 74 and 76 which support and are attached to a base plate 88. The upper portion of the L-shaped brackets 74 and 76 terminate in a shelf member 90 which is connected to the support arms 78 and 80 that are attached to the spindle carriage 66 on the milling machine 10. Located above the shelf member 90 is a second shelf member 92 that is physically attached to the lower shelf member by means of a plurality of posts 94 that provide rigidity between shelf members 90 and 92 and the L-shaped members 74 and 76.

The complete portable attachment 68 is therefore a rigid structure that is attached to the spindle carriage 66 in the fore and aft position by means of support arms 78 and 80 and also at the centermost portion of the spindle carriage by means of a bar 95 that interconnects the centermost portion of the spindle carriage 66 and the centermost portion of the upper shelf member 92. In this fashion the portable attachment 68 is rigidly supported and attached to the spindle carriage 66 as the carriage moves. In addition, once the initial adjustment for the length of the transfer arm 40 is made, no further adjustments are needed since the basic adjustment between the transfer arm and the spindle will remain constant for any given installation.

The indexing table 22 is circular in shape and has a centrally located shaft 96 for mating with a collar 98 located on the bottommost portion of the base plate 88. A spacer 100 is located on the uppermost portion of the base plate 88 in order to provide proper spacing between the table 22 and the base plate. The shaft 96 allows the table 22 to be centrally located on the base plate 88 and allows the table to be freely rotated without restriction. The indexing table 22 contains a plurality of holes on the periphery thereof for accepting a plurality of tool holders 20. The individual tool holders 20 are positioned in the holes and held by gravity. The mechanism for indexing the indexing table 22 from position to position is located on the base plate 88 and will be described in connection with FIG. 12.

The preferred embodiment was constructed using pneumatic power as the primary power source for creating the necessary movements in the transfer arm and the indexing table. The portable attachment is therefore illustrated and described in connection with a pneumatic power source however it will be understood by those skilled in the art that electrical power or hydraulic power could also be used to obtain the necessary movement since the inventive concept resides in the mechanism which allowed a portable attachment to be created and should not be limited to the power source used in creating the first operating embodiment.

The timing mechanism and the programming aspects of the master control 32 illustrated in FIG. 1 actually consist of a dual operating air cylinder 102 and 104 that causes a centrally located shaft 106 to be moved in one direction if cylinder 102 is energized and to be moved in the opposite direction if cylinder 104 is energized. Shaft 106 is fixedly attached at the outboard end 108 to an endless chain 110 that is adapted to move in first one direction or in the reverse direction depending on the movement of shaft 106. Rotating on the chain 110 is a sprocket 112 attached to a shaft 114. Located on the shaft 114 are a plurality of cams 116 each adapted to control a corresponding plurality of switches 118 in sequence to perform and energize the various lines associated with the output of the master controller 32 as illustrated in FIG. 1.

The transfer arm control 46 illustrated in FIG. 1 comprises a main drive cam 120 attached to and driven by the endless chain 110. The main drive cam 120 contains a plurality of spiral flutes 122 and is adapted to rotate within a movable cylinder 124 that is restrained to move in a predetermined manner due to the interaction between an outside cam surface 126 and a cam follower 128 located on a fixed member 130 that is attached to the lower shelf member 90.

The movable cylinder 124 has a limited rotational capacity and a limited axial capacity as determined by the cam surface 126. The full movement of the cylinder 124 will be described in connection with FIGS. 9, 10 and 11.

Located on the bottommost portion of the movable cylinder 124 is the transfer arm 40 which is fixedly attached to the cylinder 124 and therefore moves as the cylinder moves. The arm 40 is attached at right angles to the lowermost portion of the cylinder 124 and contains the jaws 38 at the outermost portion of the arm. The transfer arm 40 actually comprises a fixed portion 132 that is fixedly attached to the lowermost portion of the cylinder 124 and a rotatable portion 134 that is free to rotate 180 degrees in one direction and 180 degrees in the opposite direction relative to the fixed portion 132.

Referring now to FIGS. 5 and 6, there is shown a cross section of transfer arm 40 illustrating the fixed portion 132 and the rotatable portion 134. The rotatable portion 134 consists of a slotted cylinder 135 for accepting and holding the jaws 38. The jaws 38 are actually controlled by a shaft 136 having a pair of pistons 138 and 140 operating within a cylinder 142. Communicating with the inside cylinder 142 are ports 144 and 146. The ports 144 and 146 are positioned so that port 144 is always exposed to the face on piston 138 and port 146 is always located between the bottommost portion of piston 138 and the uppermost portion of piston 140. With air applied to port 144 a force will be developed on the face of piston 138 causing the shaft 136 to be moved outwardly so as to open the jaws 38. Conversely, air pressure applied to port 146 will generate a force on the bottommost portion of piston 138 causing the shaft 136 to move in the opposite direction thereby closing the jaws 38. The operation is such that a positive pressure is needed to either open or close the jaws 38.

Fixedly attached to the rotatable portion 136 on the side opposite the jaws 38 is a shaft 148 having a straight portion 150 in a bearing relationship within fixed portion 132 and a spiral fluted portion 152. The spiral fluted portion 152 of the shaft 148 contains four equally spaced spiral flutes.

The fixed portion 132 is attached to the lowermost portion of the cylinder 124 as illustrated and described in connection with FIG. 4 and as illustrated in FIG. 9. Located within the fixed portion 132 is a first cylinder 154 having a large diameter and a second cylinder 156 having a smaller diameter. The smaller diameter cylindrical opening 156 is approximately the same size as the diameter of shaft 148 and acts as a bearing surface for the shaft 148 to thereby allow the rotatable portion 134 to be rotated.

The length of the larger diameter cylindrical opening 154 is approximately the same as the length of the smaller opening 150 and is adapted to receive a partially split piston 158 that is free to move axially within the larger diameter opening 154. The piston 158 has a central bore for accepting the shaft 148 having the spiral flutes 152. The shaft 148 does not project beyond the opening of the large diameter cylindrical opening 154.

The piston 158 has the full circular cross section 160 for only a portion of its total length. The remaining length of the piston 158 has a cross section approximating that of half a circle. Located within the full circular cross section portion 160 are four equally spaced radially oriented pins 162 which are adapted to move within the four spiral flutes 152 located on the shaft 148.

Moving the piston 158 in an axial direction causes the pins 162 located within the circular cross section 160 to force the shaft 148 to rotate as determined by the spiral flutes 152. This rotation is a result of the fact that fixed member 132 is fixed to the transfer arm 40 and hence the rotatable member 134 is actually cammed in a rotatable direction by the interaction of the spiral flutes 152 and the fixed pins 162.

Located on that portion of the piston 158 having half a circular cross section is a cam follower 164 that is adapted to be moved in an axial direction only by means of a cam to be described in connection with FIGS. 6 and 7. By moving the piston 158 axially inward will cause the jaws 38 to rotate in a given direction and moving the piston in an axial direction outwardly will cause the jaws 38 to rotate in the opposite direction. It can be appreciated therefore that the actual angle of the spiral flutes 152 and the length of axial movement permitted the piston 158 will determine the desired 180° rotation of the rotatable member 134.

Referring now to FIGS. 7 and 8 there is shown a straight fluted shaft 166 driven at the upper end by a gear 168 having a spline corresponding to the straight flutes located on the shaft 166. The splines allow the shaft 166 to move up and down in an axial direction corresponding to the movement of the outside cylinder 124 since the gear 168 is fixed. The lower end of the straight fluted shaft 166 is connected to a cam 170 having an internal camming surface 172 on the bottommost portion. The actual configuration of the camming surface 172 is more fully illustrated in FIG. 8.

The cam follower 164 located on the piston 158 is placed within the camming surface 172 and as a result of rotating the cam 170 the piston 158 is thereby forced to move in an axial direction and at a rate determined by the convolutions of the camming surface 172.

A review of FIG. 8 will show that the movement of the piston 158 is actually determined by the position of the cam 164 within the camming surface 172 and the distance of the camming surface from the center of the cam 170. For example, movement of the piston 158 will only occur when the camming surface 172 is moved radially from the center of the cam 170. The end position 174 of the camming surface 172 represents the position of the jaws 38 when the transfer arm 40 is located over the indexing table 22. Movement of the transfer arm 40 in a vertical direction will have no effect upon the rotation of the cam 170 since the straight fluted shaft 166 will simply move in a vertical direction and through the splines located on the driving gear 168 as illustrated in FIG. 7.

Position 176 on the cam surface 172 corresponds approximately to the position of the transfer arm 40 as the jaws 38 approach the milling machine 10. It will be noted that the distance of positions 174 and 176 relative to the center of the cam 170 are the same and hence during the rotation of the cam there is no radial change of the cam surface and hence there is no movement of the piston 158 and hence no rotation of the jaws 38. The complete 180 degree rotation of the jaws 38 must take place during the radial change of the cam surface 172 from the outermost portion as evidenced by positions 174 and 176 to the innermost portion as evidenced by position 178.

The initial radial movement of the cam surface 172 from the outermost portion 176 to position 180 occurs as the transfer arm 40 approaches the spindle 16. The radial change of the cam surface from 176 to 180 causes the piston 158 to move so as to rotate the jaws 38 approximately 90 degrees as evidenced by the fact that cam position 180 is approximately half the distance between cam position 176 and cam position 178. Rotating the jaws 38 approximately 90 degrees from the initial position allows a minimum of spacing between the spindle 16 on the milling machine 10 and the work piece 13 as it is located on the movable table 14. In other words the spatial distance between the spindle and the work piece needed to insert the tool holder can be less than the length of the tool holder plus the cutting tool. In the absence of this unique movement it would be necessary to provide a space between the spindle 16 and the work piece 13 that is greater than the length of the tool holder and the tool.

The distance of the camming surface from position 180 to the end position 178 varies from a substantially concentric movement which would mean substantially no rotation of the tool holder to the end position 178 where the camming surface rapidly approaches the center of the cam 170 to complete the full 180 degree rotation of the jaws 38. A review of FIGS. 5, 6, 7 and 8 will show that as the cam 170 is rotated the cam follower 164 located on the piston 158 urges the piston to move in an axial direction either in or out thereby forcing the fixed pins 162 to move within the spiral flutes 152 located on the shaft 148 to urge the rotatable portion 134 holding the jaws 38 to rotate in the manner just described.

The foregoing discussion is concerned only with the rotation of the jaws 38 which is occasioned by the rotation of the straight fluted shaft 166 as illustrated in FIG. 7. Rotation of the straight fluted shaft 166 in first one direction will therefore rotate the jaws 38 in a first direction for 188 degrees and rotation of the straight fluted shaft in the opposite direction will therefore rotate the jaws 38 in the opposite direction for 180 degrees.

Referring now to FIGS. 9, 10 and 11, there is shown in greater detail the operation and construction of the transfer arm 40. In order to more fully understand and appreciate the concepts concerning the transfer arm 40 it is throught best at this time to review in detail the movements required of the transfer arm from the time the jaws select a tool holder and place the tool holder into the spindle of the milling machine.

For illustration purposes we will assume the transfer arm is in position near the milling machine 10 and that the jaws 38 are opened to allow the cutting tool room to perform the necessary work functions on the work piece 13. At the termination of the cutting operation the numerical controller 12 returns the movable table 14 to the home position and limit switch 30, illustrated in FIG. 1, will energize the master controller 32. The following sequential functions are performed as follows:

1. The jaws 38 close;
2. The impact tool wrench 28 is energized to loosen the holding tool 20 from the spindle 16;
3. The transfer arm 40 moves in a vertical direction away from the spindle 16 while the jaws 38 hold the tool holder 20;
4. At substantially the same time the jaws 38 begin to rotate to a first position 90 degrees from vertical;
5. The transfer arm 40 translates the jaws 38 holding the tool holder from the spindle 16 to a position over the index table 22;
6. At substantially the same time the jaws 38 are rotated an additional 90° to complete the 180° rotation;
7. The transfer arm is moved in a vertical direction placing the tool holder on the index table 22; and
8. The jaws 38 are opened.

The functions of rotating the jaws 38 were described in connection with FIGS. 5, 6, 7 and 8 and are determined solely by the direction of rotation of the straight fluted shafts 166 and are otherwise completely independent of any other movement of the transfer arm 40 whether it is translating or whether it is moving in a vertical upwards or vertical downward direction.

Referring now to FIGS. 9, 10 and 11 there is shown in greater detail the transfer arm 40 and the chain 110 that directly drives the main drive cam 120. In other words the direction of rotation of chain 110 will directly drive and rotate the main drive cam 120 which contains the spiral flutes 122 previously described. The movable cylinder 124 accepts the main drive cam 120 and is free to otherwise move either in a rotating direction as the cam 120 rotates or in a vertical direction as determined by the external constraints of cam surface 126 and the cam follower 128.

The rotational or axial movement of the cylinder 124 is restrained by the external cam surface 126 cut in the external periphery of the cylinder. The cam surface 126 defines a first vertical position 190, a horizontal position 192 and a lower second vertical position 194. The cam follower 128 is fixedly attached to bracket 130 that is in turn attached to the lower shelf member 90 thereby allowing the cylinder 124 to move only in the manner as defined by cam surfaces 194, 192 and 190.

Referring more specifically to FIG. 10 there is shown a cross section of FIG. 9 taken along lines 10—10 which illustrates four bearing members 200, 202, 204 and 206 located orthogonally with respect to each other and each fixedly attached to the inside periphery of the cylinder 124. Each of the four bearing members ride in one of the spiral flutes 122 located on the main drive cam 120. A review of the operation will show that as the chain 110 rotates the main drive cam 120 that the action of the spiral flute 122 on each of the bearing members 200, 202, 204 and 206 will attempt to cause the cylinder 124 to rotate. Rotation of the cylinder 124 is permitted while the cam follower 128 is in the horizontal position 192 of the cam surface 126. Rotation of the cylinder 124 will continue until the cam follower 128 becomes located in the vertical position 190 of the cam surface 126 at which time rotation of the cylinder is interfered with and the cylinder 124 is forced to move only in a vertical downward direction. Similarly should the cam follower 128 be positioned in the vertical position 194 of the cam surface 126 then the cylinder 124 is forced to move in a vertical upward direction.

By way of review, therefore, it can be shown that the cam surface 126 more fully illustrated in FIG. 11 provides the means for controlling the vertical raising and lowering of the transfer arm by means of surfaces 194 and 190 and also controls the translation of the transfer arm from the index table to the spindle by means of the horizontal cam surface 192. The length of the vertical cam surface 190 will be determined by the clearance between the indexing table 22 and the jaws 38 located on the transfer arm 40 whereas the length of the vertical cam surface 194 will be determined by the distance between the jaws 38 and the spindle 16 of the milling machine 10. The length of the horizontal cam surface 192 is a function of the distance between the indexing table 22 and the spindle 16 located on the milling machine.

The driving force for obtaining the raising and lowering of the transfer arm and the translation of the transfer arm from the index table to the spindle as well as the power for providing the 180 degree rotation of the jaws is all obtained from the chain 110 which is fixedly attached to drive the main drive cam 120 as illustrated in FIG. 9. In order to obtain the necessary movement to energize the rotation of the jaws 38 independently of the movement of the main drive cam 120 it was necessary to provide an intermediate gear train between the main drive cam 120 and the straight fluted shaft 166 that controls the rotation of the jaws 38 as illustrated in FIG. 7.

The additional gear train as illustrated in FIG. 9 provides an additional 3 to 1 increase in speed from the rotation of the main drive cam 120 to the rotation of the straight fluted shaft 166. The straight fluted shaft 166 is located within the main drive cam 120 and supported by internal ball bearings to allow the straight fluted shaft 166 to rotate independently of the rotation of the main drive cam 120. Directly connected to the shaft of the main drive cam 120 is a gear 210. Gear 210 drives gear 212 that is fixedly attached to gear 214 which drives gear 168 which is engaged in a spline driving relationship with the straight fluted shaft 166. Gear 210 which is driven by the main drive cam 120 is approximately three times larger in diameter than driven gear 212 and hence there is obtained a 3 to 1 relationship since gear 214 which is fixedly attached to gear 212 is in a 1 to 1 relationship with driven gear 168 that ultimately drives the straight fluted shaft 166. In this fashion the additional movement required by the straight fluted shaft 166 is obtained and the 180° rotation as described in connection with FIGS. 5, 6 and 7 is obtained in the manner that is independent of the movement of the cylinder 124.

The indexing table 22 is normally held in a locked position while the transfer arm 40 is moving either from the indexing table to the spindle or moving from the spindle back to the indexing table. When the transfer arm 40 takes the tool holder from the spindle 16 on the milling machine and returns the tool holder back to the indexing table 22 the last program act of the moving arm is to open the jaws 38 and allow the index table to index to the next position having a tool holder. After the index table 22 has moved to the next position the jaws 38 are closed and the new tool holder selected and positioned within the spindle 16 on the milling machine 10.

Figure 12A:
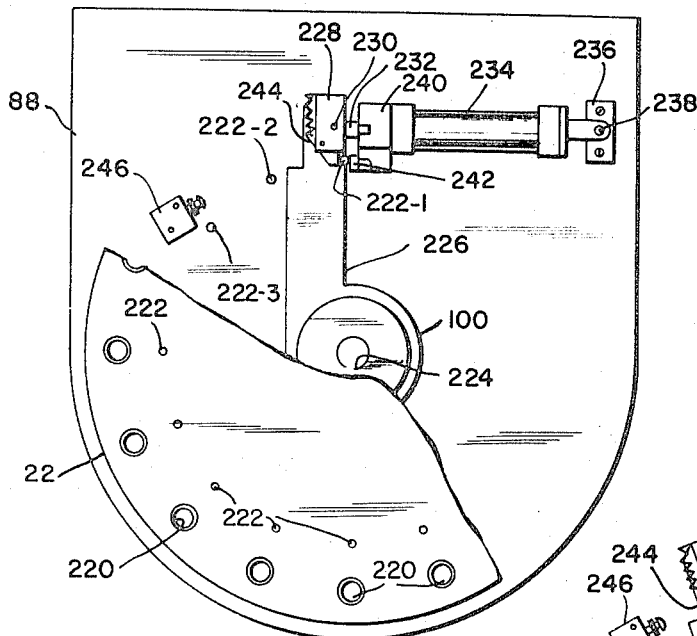
FIG. 12a through 12e is a series of drawings illustrating the indexing of the indexing table.

FIGS. 12a through e illustrate how the indexing table 22 is held in a locking position while the transfer arm 40 is moving and also how the indexing table is sequentially indexed for selecting the next available tool holder 20. FIG. 12a illustrates the base plate 88 holding the indexing table 22 in position. The indexing table 22 is partially cut away in order to more fully illustrate the index mechanism. The indexing table 22 contains a plurality of holes 220 located on the periphery of the table for holding the tool holders 20 in an ordered relationship. Located on the bottommost portion of the indexing table 22 are a plurality of index pins 222, one for each of the holes 220. The index pins 222 extend below the table 22 and are more fully illustrated in FIGS. 3 and 4. The index pins 222 are selectively positioned with respect to their associate tool holder hole 220 in order to precisely align the hole with the jaws 38 on the transfer arm 40.

FIG. 12a illustrates the collar 100 located over the opening 224 through which the shaft 96 which is attached to the indexing table 22 is inserted. The indexing table 22 is normally free to rotate over the collar 100 in a non-interfering relationship. Located between the collar 100 and the base plate 88 is an arm 226 that is pivotably mounted for limited rotation about the opening 224. The opposite end of the arm 226 contains a block member 228 that is pivotably attached at 230 to a piston 232 that is attached to an air cylinder 234.

The air cylinder 234 is attached to the base plate 88 at one end 236 only and is free to pivot as at 238 about the fixed position. The free end 240 of the air cylinder 234 contains a bearing surface 242 that is adapted to hold an index pin 222 when the piston 232 is fully retracted within the air cylinder 234. The block member 228 located on the rotatable arm 226 contains a pivotal cam 244 capable of driving an index pin 222 in only one direction.

A review of FIG. 12a will show that inserting piston 232 within air cylinder 234 forces the pivotal cam 244 within the block member 228 against the index pin 222-1 thereby holding the index pin between the pivotal cam and the bearing surface 242 located on the free end 240 of the cylinder 234. In this configuration the index pin is solidly held in place and the indexing table 22 will be held and maintained in a fixed position while the transfer arm 40 is moving.

Figure 12B:
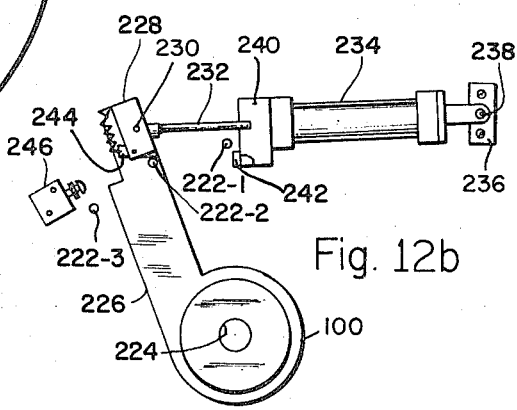

After the transfer arm 40 has replaced the tool holder 22 within the opening 220 located on the indexing table 22 the jaws 38 are opened and the air cylinder 234 is energized so as to force the piston 232 out of the air cylinder and away from the cylinder as shown in FIG. 12(b).

Extending the piston 232 from the air cylinder 234 forces the rotatable arm 226 to be pushed back and away in a rotatable fashion around the central opening 224 located in the base table 88. As the block member 228 on the free end of the rotatable arm 226 passes the index pin 222-2 the pivotal cam 244 is pivoted around the index pin so as to pass the pin without causing any movement on the pin itself. This action is more fully illustrated in connection with FIG. 12(b).

Figure 12C:
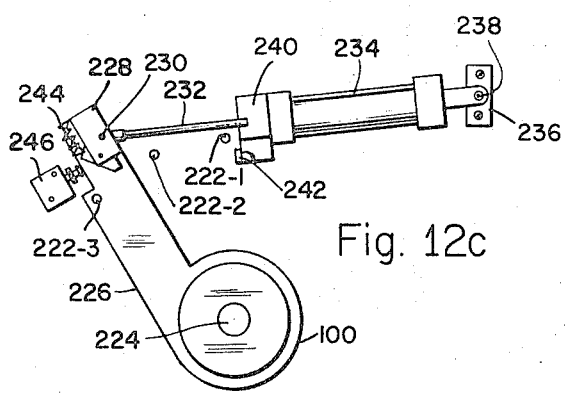
Figure 12D:
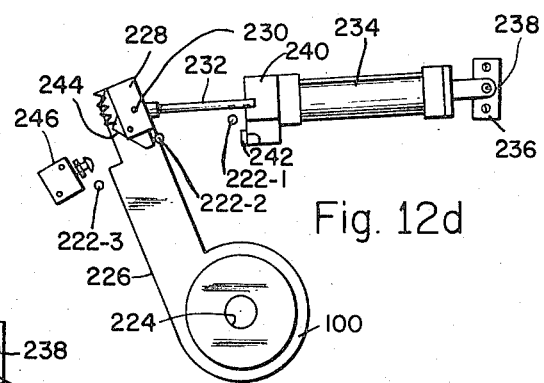

Referring now to FIG. 12(c) there is shown a limit switch 246 acting upon the block member 228 located on the free end of the pivotal arm 226. In this configuration the piston 232 is fully extended and the pivotal arm 226 has rotated the maximum distance allowed by the limit switch 246. A careful review of the geometry involved will show that air cylinder 234 has pivoted around point 238 which is otherwise fixed to the base plate 88 and due to the rotation of pivotal arm 226 has caused the bearing surface 242 located on the free end of the cylinder 234 to move in a radial direction that is closer to the center of the base plate 88 as defined by the opening 224. This action is very important to the indexing mechanism since the movement of the bearing surface 242 in a direction towards the opening 224 now allows the index pin 222-1 to be clear of the bearing surface when the pivotal cam 244 contacts index pin 222-2 as shown in FIG. 12(d).

A review of FIG. 12(b) shows the pivotal cam 244 aligned in a pushing relationship against the index pin 222-2. It should be noted however that at this point the limit switch 246 illustrated in FIG. 12(c) has caused the air cylinder 234 to pull on the piston 232 thereby moving the pivotal arm 226 back to a more vertical position. The moving piston 232 has caused the air cylinder 234 to be moved radially in such a direction as to now allow sufficient clearance between the bearing surface 242 and the index pin 222-1 to now allow the index pin to move freely and without interference of the bearing surface.

Figure 12E:
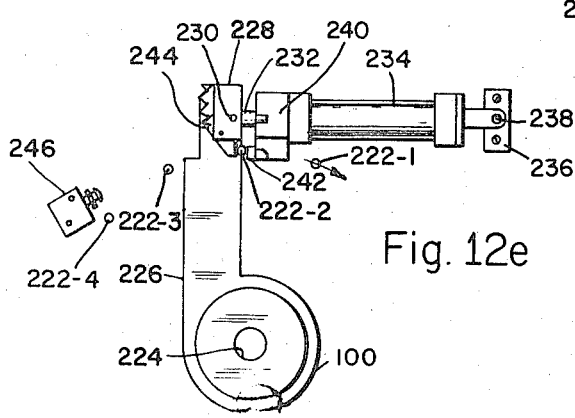

Referring now to FIG. 12(e) there is shown a fully indexed position with the piston 232 fully retracted within the air cylinder 234 and the index pin 222-2 solidly held between the bearing surface 242 and the pivotal cam 244. A review of the geometry will show that as the piston 232 is pulled into the air cylinder 234 that the air cylinder is moved in a radial direction that is away from the center of the opening 224, a distance that is sufficient to trap the index pin between the bearing surface 242 and the pivotal cam 244.

With the indexing table 22 indexed a full position the air cylinder 234 remains energized to hold the index pin in a tight locking relationship. At this point in time the master controller 32 energizes the jaws 38 which grab the tool holder in the next opening in the indexing table to again repeat the cycle of removing the tool holder for eventual location within the spindle 16 on the milling machine 10. It will be appreciated therefore that the indexing table is held in a locked position at all times other than when the indexing table is actually being indexed.

What I claim is:

1. A system for sequentially operating an indexing device comprising:
    a horizontally located indexing device having a plurality of pins located on the bottom-most portion of said device and aligned on a circumference and in which said indexing device is free to rotate about a centrally located shaft,
    an arm member pivotally mounted for limited rotation about said centrally located shaft and having a ratchet member for sequentially engaging one of said indexing pins in a driving relationship in one direction only,
    an expandable driving member pivotally attached to a base member at one end and pivotally attached to the periphery of said arm member at the other end for rotating said arm member in first one direction when expanded and a second direction when retracted and in which an indexing pin is held in a locking relationship between said arm member and said expandable driving member only when said driving member is fully retracted.

2. A system according to claim 1 in which said expandable driving member is movable radially towards said centrally located shaft when expanded thereby unlocking said indexing pin and allowing movement of said indexing device.

3. A system according to claim 1 in which said expandable driving member includes a piston and cylinder combination pivotally attached to a base member at one end and pivotally attached to the periphery of said arm member at the other end for rotating said arm member in first one direction with the piston extended and in the other direction with the piston retracted and in which said indexing pin is held in a locking relationship between said arm member and said cylinder only with said piston fully inserted in said cylinder.

4. A system according to claim 3 in which said cylinder is movable radially towards said centrally located shaft when said piston is extended thereby unlocking said indexing pin and allowing movement of said indexing device.

* * * * *